(12) United States Patent
Rogers et al.

(10) Patent No.: US 10,865,154 B2
(45) Date of Patent: Dec. 15, 2020

(54) PELLETIZED SPENT LIME AND PROCESS OF MAKING SAME FROM WASTEWATER TREATMENT RESIDUE

(71) Applicant: Prolime Inc., Washington, MI (US)

(72) Inventors: Robert V. Rogers, Washington, MI (US); Jason A. Rogers, Washington, MI (US)

(73) Assignee: PROLIME INC., Washington, MI (US)

( * ) Notice: Subject to any disclaimer, the term of this patent is extended or adjusted under 35 U.S.C. 154(b) by 0 days.

(21) Appl. No.: 16/280,840

(22) Filed: Feb. 20, 2019

(65) Prior Publication Data

US 2019/0256433 A1   Aug. 22, 2019

Related U.S. Application Data

(60) Provisional application No. 62/633,134, filed on Feb. 21, 2018.

(51) Int. Cl.
| | | |
|---|---|---|
| *C05D 3/02* | (2006.01) |
| *B01J 2/14* | (2006.01) |
| *A01C 21/00* | (2006.01) |
| *B01J 2/28* | (2006.01) |
| *C02F 1/52* | (2006.01) |

(52) U.S. Cl.
CPC ............... *C05D 3/02* (2013.01); *A01C 21/00* (2013.01); *B01J 2/14* (2013.01); *B01J 2/28* (2013.01); *C02F 1/5236* (2013.01); *C02F 2303/18* (2013.01)

(58) Field of Classification Search
None
See application file for complete search history.

(56) References Cited

U.S. PATENT DOCUMENTS

| | | | | |
|---|---|---|---|---|
| 6,406,510 B1* | 6/2002 | Burnham | ................ | C05F 7/00 71/11 |
| 6,413,291 B1* | 7/2002 | Wommack | ............... | C05D 3/00 71/15 |
| 2011/0253634 A1* | 10/2011 | Soane | ....................... | C02F 1/28 210/680 |

* cited by examiner

*Primary Examiner* — Wayne A Langel
(74) *Attorney, Agent, or Firm* — Blue Filament Law PLLC

(57) ABSTRACT

Water-dispersible pellets are provided that includes spent lime particles present from 80 to 99.5 total weight percent. A binder component is also present from 20 to 0.5 total weight percent. The pellets have a mean pellet domain size. The spent lime particles, and the binder component present in a form such that contact with water causes pellet dispersion into more than 100 pieces. A process of forming spent lime pellets is also provided that include spent lime being dewatered to a free-flowing powder. A binder is then added under conditions to induce agglomeration of the free-flowing powder to the form the pellets. A process of treating a target crop is also provided based on such pellets.

18 Claims, No Drawings

PELLETIZED SPENT LIME AND PROCESS OF MAKING SAME FROM WASTEWATER TREATMENT RESIDUE

RELATED APPLICATIONS

This application claims priority benefit of U.S. Provisional Application Ser. No. 62/633,134 filed Feb. 21, 2018; the contents of which are hereby incorporated by reference.

FIELD OF THE INVENTION

The present invention relates in general to water-dispersible pellets for calcium addition to target crops and in particular, to water-dispersible spent lime pellets produced from wastewater treatment residual lime.

BACKGROUND OF THE INVENTION

Lime materials are routinely used to pre-treat water and to treat waste water. Drinking water is routinely treated with lime to soften water by removing carbonate and other anions that contribute to hardness that renders soaps ineffectual therein.

In the softening process, lime materials completely precipitate out metals, perform anion exchange, as well as flocculating suspended solids and dissolved solids. The resulting pH increase also serves to protect plumbing from acidic corrosion.

Lime materials are used in municipal waste water treatment to reduce pathogen loading in biosolids to produce N-P-K rich fertilizers. Phosphates are efficiently precipitated by lime to reduce the eutrophication of bodies of water receiving treated water.

Regardless of the form, when lime has been used to treat an acidic material, a precipitated $CaCO_3$ is obtained that is routinely referred to as spent lime. Unfortunately, spent lime as a hydrated slurry from water treatment is routinely sent to landfills.

Numerous crops, including turf grass as susceptible to damage when soil pH values are excessively acidic. Characteristics of turf pH imbalance are excess weed growth, patchy growth, yellowing, or a combination of thereof. One of the primary methods of correcting this problem is to add lime to turf to restore depleted nutrients and repair the damage. Soil pH is affected by a variety of factors that illustratively include rainfall, organic matter decay, fertilizers applied, pesticides applied, and pollution; and as such can drift from desired levels over time.

Limestone is routinely spread on a target crop if the soil pH is too low. Limestone, often referred to synonymously as agricultural lime, or calcic limestone that is predominantly the chemical calcium carbonate, $CaCO_3$; and is applied as a fine powder. The other conventional types of materials applied to crops include burnt lime, often referred to synonymously as quick lime, or caustic lime that is predominantly the chemical calcium oxide, $CaO$; and hydrated lime, often referred to synonymously as slaked lime that is predominantly the chemical calcium hydroxide, $Ca(OH)_2$. Natural limestones also vary in the relative amounts of calcium and magnesium, with calcium limestones referred to as calcitic, and mixed limestones referred to as dolomitic. While conventional, treating soil with the aforementioned lime materials has several problems including the caustic nature of some the products, comparatively high cost, slow action to raise pH, a potential for localized caustic burning of the target crop, and fouling of spreader equipment. While some of these problems are more pronounced for a given material as compared to another, there remains a complexity to application and the possibility for harm to the target crop.

Conventional drop-style spreaders are often inadequate when applying agricultural lime, as the finely ground particles tend to bridge the spreader openings. Rotary-type spreaders are often more effective, although the density tends to damage such spreader. Owing to the dangers of localized caustic "burning" of turf, hydrated or burned lime are rarely used.

A practical and labor-saving approach to treating target crops such as turf in areas such as golf courses, parks, lawns, gardens and woodlands has been broadcast application of granular agricultural lime, for example via rotary spreader. Using granular products having particle sizes in the range of about 1 millimeter to about 10 millimeters, an operator can cover a large area with minimal distance traversed by the spreader itself, while applying the particles relatively uniformly to the desired area. As such lime particles remain solid for years following their application, particles are readily displaced by practices such as mowing, leaf and/or yard waste vacuuming; or run-off from weather events, especially on sloping ground where the underlying soils have low percolation rates; where the ground cover is closely mown or relatively thin and sparse; and where the equipment or pedestrians traffic is high. This causes a loss of the uniformity in the response sought for the lime product. In addition, caustic burning can result due to excessive concentration within the areas treated. The long persistence of the conventional lime particles also results in a greater likelihood that people and or animals may come into physical contact with the granules, which may result in skin irritation.

Thus, there exists a need a pelletized lime product for treating target crops that more effectively percolates into soil. There also exists a need for a use for water treatment produced spent lime so as to avoid landfill dumping of same.

SUMMARY OF THE INVENTION

Water-dispersible pellets are provided that includes spent lime particles present from 80 to 99.5 total weight percent. A binder component is also present from 20 to 0.5 total weight percent. The pellets have a mean pellet domain size. The spent lime particles, and the binder component present in a form such that contact with water causes pellet dispersion into more than 100 pieces.

A process of forming spent lime pellets is also provided that include spent lime being dewatered to a free-flowing powder. A binder is then added under conditions to induce agglomeration of the free-flowing powder to the form the pellets.

A process of treating a target crop is also provided that includes such pellets being broadcast onto an area of soil containing the target crop. The area is wet with an amount of water sufficient to induce pellet dispersion into substituent spent lime particles adapted to percolate into the soil to treat the target crop.

DETAILED DESCRIPTION OF THE INVENTION

The present invention solves the problems associated with persistence of limes powders that are broadcast onto soil by providing pellets formed of spent lime particles agglomerated with a binder so as to be water-dispersible. The inventive pellets, when handled without coming into contact with water, have physical characteristics that inhibit the bridging and other distribution problems associated with agricultural lime powder thereby facilitating broadcast application. Following application, the inventive pellets disperse on contact with moisture from the treated area itself, from irrigation or from natural precipitation. The water dispersion of the pellets into constituent particles of spent lime downward into the soil promotes faster soil pH modification owing to the higher surface area to volume ratio of the particle substituents of an inventive pellet relative a monolithic agricultural lime particle and also is less likely to be removed from the treated area or contacted by people or animals.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

As used in the description of the invention and the appended claims, the singular forms "a," "an" and "the" are intended to include the plural forms as well, unless the context clearly indicates otherwise.

Unless indicated otherwise, explicitly or by context, the following terms are used herein as set forth below.

Also as used herein, "and/or" refers to and encompasses any and all possible combinations of one or more of the associated listed items, as well as the lack of combinations when interpreted in the alternative ("or").

The present invention relates to a water-dispersible pellet containing spent lime particles, composed of calcium carbonate, $CaCO_3$, and in some instances a lesser quantity by weight of magnesium hydroxide, $Mg(OH)_2$, both in combination in total present from 80 to 99.5 total weight percent and a binder component present from 20 to 0.5 total weight percent. The spent lime particles and the binder component are present in a form such that contact with water causes pellet dispersion into more than 100 pieces. The pellet has a mean pellet domain size of between 0.5 mm and 4 mm in certain inventive embodiments. The invention further relates to a process for making and using the water-dispersible pellet. The inventive pellet retains its size and shape during handling and application to a desired area and dissolves, disperses, or crumbles into small particles upon contact with a water overspray. The dispersion can occur in a matter of seconds to a time of up to 24 hours based on the specifics of the pellet. Some factors that control the rate of water dispersion include pellet size, the nature and amount of the binder, the size of the spent lime particles within the pellet, and any optional surface coatings present on the pellet. Inventive pellets are free flowing when dry, making them amenable to broadcast distribution onto a soil plot containing a target crop. Inventive pellets also have sufficient the durability to inhibit crushing and dusting during handling and application to the target crop.

The term dispersion in the context of the present invention is intended to define an inventive pellet disperses by breaking into numerous smaller pieces upon contact with water. In some inventive embodiments, an inventive pellet disperses by breaking up into greater than 100 smaller pieces upon contact with water over a period of time ranging from 1 second to 24 hours. In other inventive embodiments, an inventive pellet disperses into 300 to 10,000 smaller pieces over a period of time ranging from 1 second to 12 hours and in some embodiments 30 seconds to 1 hour.

The ability of the inventive pellets to disperse in water is generally measured in a water dispersibility test. The test involves placing about 10 grams of the inventive material into 100 ml of water at room temperature in a closed glass container. The container is then inverted and the time is observed until the material disperses. After every minute, the container is inverted.

The term spent lime as used herein refers to not only precipitated calcium carbonate, but also precipitated calcium carbonate containing minority by weight amounts of other calcium inorganics, magnesium carbonates, or combinations thereof.

An inventive pellet is formed from spent lime. A particularly advantageous source thereof is that generated by a water treatment facility. In some inventive embodiments, spent lime is generated by adding lime to unsoftened water, also commonly referred to as hard water, in order to precipitate minerals from the water that cause water hardness. These insoluble precipitates form a residue that is a precursor for an inventive pellet.

The residue so obtained is in some inventive embodiments, washed with water, surfactants solutions, or chelating agent solutions to remove entrained trace metals, organic contaminants or a combination thereof that are not desired to be applied to a target crop. Chelating agents operative herein illustratively include illustratively include ethylenediamine disuccinic acid (EDDS), ethylenediamine dimalonic acid (EDDM), and ethylenediamine diglutaric acid (EDDG), ethylenediaminetetraacetic acid (EDTA), diethylenetriaminepentaacetic acid (DTPA), nitrilotriacetic acid (NTA), iminodiacetic acid (IDA), iminotriacetic acid (ITA), ethylenediamine (En), N,N'-diethylenediamine (Den), diethylenetriamine (DTN), diethylenetetramine (Trien), triaminotriethylene amine, triethanolamine, malonic acid, succinic acid, glutaric acid, citric acid, fumaric acid, maleic acid, aconitic acid, hydroxyethylethylene diamine triacetic acid (HEDTA), or combinations thereof. Before being further processed to form spent lime 14 of suitable or desired consistency for use in composite fill material 22.

The residue is then dewatered by conventional techniques such as settling, pressing, or combinations thereof. It is of note that spent lime is characterized by being non-reactive with water and only forms hydrates, specifically a hexahydrate, with limited thermal stability. A typical composition of spent lime is 80 to 90 percent by weight calcium carbonate, $CaCO_3$, with the remaining 20 to 10 percent by weight being $Mg(OH)_2$, however the composition is appreciated to vary with the geological source of the limestone initially used.

The spent lime, regardless of the source, is then dried to a water content of less than 5 total weight percent and in some inventive embodiments, between 0.1 and 3 total weight percent. The dried spent lime is then ground and sieved to a mean particle size of between 10 and 175 microns. In some inventive embodiments, the spent lime particle size is between 30 and 150 microns. The resulting spent lime particles have a flour-like consistency and behaves as a free-flowing powder.

The resulting spent lime powder is then combined with a binder and additional optional additives to form an inventive pelletized material. In some inventive embodiments, spent lime particles are provided as a free-flowing powder that is mechanically aggregated into pellets in a pan-granulator in the presence of a binder. The binder is sprayed into the pan granulator with the spent lime particles. The pellets are dried and the resulting pellets are size-screened and pellets of desired size are stored. In some inventive embodiments, the inventive pellets are transferred to a coating drum for addition of an active ingredient or other surface coating.

In still another inventive embodiment, spent lime particles are mechanically aggregated into pellets in a PAN drum-granulator, Pin, Paddle, or Eirich mixer in the presence of a binder. The binder is sprayed into the PAN drum granulator Pin, Paddle, or Eirich mixer with the spent lime powder. The resulting pellets are dried and the resulting pellets are size-screened and pellets of desired size are stored. In some inventive embodiments, the pellets are transferred to a coating drum for addition of an active ingredient or other surface coating.

A binder for an inventive pellet is selected that produces or promotes cohesion of the spent lime particles. The binder component is present in amounts ranging from 1 to 5 total weight percent of the total dry weight of the pellet. Binders operative herein illustratively include carbohydrates such as monosaccharides, disaccharides, oligosaccharides and polysaccharides; proteins; lipids; glycolipid; glycoprotein; lipoprotein; and combinations and derivatives of these. Specific carbohydrate binders illustratively include glucose, mannose, fructose, galactose, sucrose, lactose, maltose, xylose, arabinose, trehalose and mixtures thereof such as corn syrup; celluloses such as carboxymethylcellulose, ethylcellulose, hydroxyethylcellulose, hydroxy-methylethylcellulose, hydroxyethylpropylcellulose, methylhydroxyethyl-cellulose, methylcellulose; starches such as amylose, seagel, starch acetates, starch hydroxyethyl ethers, ionic starches, long-chain alkyl starches, dextrins, amine starches, phosphates starches, and dialdehyde starches; plant starches such as corn starch and potato starch; other carbohydrates such as pectin, amylopectin, xylan, glycogen, agar, alginic acid, phycocolloids, chitin, gum arabic, guar gum, gum karaya, gum tragacanth and locust bean gum; complex organic substances such as lignin and nitrolignin; derivatives of lignin such as lignosulfonate salts illustratively including calcium lignosulfonate, sodium lignosulfonate, ammonium lignosulfonate, magniesum lignosulfonate, and complex carbohydrate-based compositions containing organic and inorganic ingredients such as molasses. Suitable protein binders illustratively include soy extract, zein, protamine, collagen, and casein. Binders operative herein also include synthetic organic polymers capable of promoting or producing cohesion of methylene urea oligomer fines and these illustratively include ethylene oxide polymers, polyacrylamides, polyacrylates, polyvinyl pyrrolidone, polyethylene glycol, polyvinyl alcohol, polyvinylmethyl ether, polyvinyl acrylates, polylactic acid, and latex. In the following examples, the binder is calcium lignosulfonate, molasses, a liquid corn starch or syrup, or a combination thereof.

In some inventive embodiments, a soil active ingredient is associated with an inventive pellet either homogenously admixed therein, as a surface coating, or a combination thereof. A soil active ingredient, if present, is present in an amount ranging from 0.1 to 10 total weight percent of the pellet.

A soil active ingredient operative herein illustratively includes a biological factor, a biostimulant, humic acid, amino acids, or combinations thereof.

Various ways of drying the inventive pellets are available including fluid bed drying. The pellets is placed in a fluid bed drier and the drier inlet air temperature ranges from about 50° C. to about 300° C. Further methods of drying pellets operative herein illustratively include use of a rotary drum dryer and drying under vacuum conditions.

A soil active ingredient is associated with a pellet during the process of pellet formation or after pellets are formed. For example, a soil active ingredient is mixed with the binder. The binder/active ingredient mixture is added to spent lime particles and mechanically aggregated in a pan granulator resulting in pellets wherein the soil active ingredient and spent lime particles are in suspension in the binder.

Where it is desirable to add the soil active ingredient after pellet formation, the active ingredient is added to the particle following pellet formation in the presence or absence of an adhesive. Methods of soil active ingredient addition illustratively include spraying onto the particle or adsorption of the active ingredient by coating the particle in a non-aqueous solution of the active ingredient.

In another embodiment, the soil active ingredient is mixed with an adhesive before application to a pellet. An adhesive is a substance that binds to a pellet such that the soil active ingredient adheres to the pellet in suspension in the adhesive. The adhesive may be the same as the binder or different. The choice of adhesive depends on the pellet components and will be evident to one skilled in the art. Examples of adhesives illustratively include substances listed herein as binder components.

For example, the active ingredient in powdered form is adhered to the outside surface of the particle with the use of an adhesive. An adhesive liquid may be used and is applied before or after the addition of the powdered active ingredient or it may be applied at the same time as the active ingredient. The choice of adhesive depends on the particle components and will be evident to one skilled in the art. Examples of a liquid adhesive include but are not limited to binders listed herein, including mineral oils or polymer liquids such as polybutene.

The pellets of the present invention have a minimum Resistance To Attrition (RTA) rating ranging from 60% to 100% as determined by Example 3.

The pellets of the present invention have a mean pellet domain size that ranges from 0.1 millimeter to 30 millimeters. In still other embodiments, the mean pellet domain size ranges from 0.25 millimeter to 20 millimeters. In still other embodiments, the mean pellet domain size ranges from 0.50 millimeter to 15 millimeters. The pellets formed by the process of the present invention have a Uniformity Index rating in the range of 30 to 60 where the Uniformity Index rating is calculated as the $10^{th}$ percentile pellet size expressed as a percentage of the $95^{th}$ percentile pellet size.

Pellets of the present invention take any shape illustratively including spheres, cylinders, ellipses, rods, cones, discs, needles and irregular. It is appreciated that tumbling based granulator tend to pellets that are approximately spherical.

The pellets of the present invention are administered to a target crop to produce a desired effect associated with spent lime addition thereto and at loading conventional to the art. The pellets are well-suited to be delivered to a target crop, such as a golf course lawn, by broadcast scattering via rotary spreader. The pellets are then dispersed by water which is user-applied or natural such as rain, dew or atmospheric humidity to induce dispersion of substituent particles into the soil.

Alternatively, the pellets are placed in a limited target area such as near a particular desired plant in a garden or in a crop row. In another embodiment, the pellets are placed under the soil surface.

A target crop illustratively includes cultivated plants such as lawn grass, and grain crops.

The present invention is further detailed with respect to the following examples. These examples are illustrative of specific embodiments of the present invention and not intended to limit the scope of the appended claims.

Example 1

Using a pan agglomeration disk, a binder of calcium lignosulfanate, corn starch, and corn syrup in equal weight amounts and a total weight percentage of 5 total weight percent, is applied to a mixture of dry and free-flowing spent lime particles. The agglomeration disk is operated and adjusted to generate the desired size distribution of pellets before the pellets are conveyed to a fluid bed drier where the material is dried at a temperature of 50° C. to a moisture content of less than 1 total weight percent. The pellets are then separated into various size categories using conventional gyroscopic screeners. General size of these product streams are as follows, 3,360 microns and larger, from 3,360 microns to 1,191 microns, from 1,191 microns to 594 microns, and material smaller than 594 microns. The range of sizing for each product stream can be varied to separate the desired material from the mixture of sizing.

Example 2

The process of Example 1 is repeated with only calcium lignosulfonate as a binder to obtain like pelleted material grades.

Example 3

To test RTA, a Ro-Tap sieve shaker with 8-inch sieves, balance with 0.1 g sensitivity, 10-min timer, and 10 steel balls with smooth surfaces and 16 mm (⅝ in.) in diameter is used. About 75 g of a representative sample of Example is placed onto the limiting screen. The screen apparatus is reassembled with the limiting screen just above the pan and run on the shaker for 10 minutes. 50.0 g of the sample is transferred to the pan with the steel shot. The screen apparatus is reassembled run on the shaker for 10 minutes. The steel balls are them removed from the pan and the sample is transferred back into the limiting screen. The screen apparatus is placed back onto the shaker and run it for 10 minutes again. The amount that remains on the limiting screen is weighed to the nearest 0.1 g and compared it to the original amount. Percent resistance to attrition={(100•a)/b}, where a is the weight of the fraction that remained on the final limiting screen and b is total weight of the intermediate sample.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. A group of water-dispersible pellets, each pellet of the group of pellets comprising:
   spent lime particles present from 96 to 99.5 total weight percent and wherein the spent lime particles have a mean particle size based on particle number of between 10 and 175 microns; and
   a binder component present from 4 to 0.5 total weight percent, the group of pellets having a mean pellet domain size, the spent lime particles, and the binder component present in a form such that contact with water causes pellet dispersion into more than 100 pieces for each pellet of the group of pellets.

2. The group of pellets of claim 1 wherein the spent lime particles are greater than 80 total weight percent of calcium carbonate and hydrates thereof.

3. The group of pellets of claim 1 wherein the binder is at least one of: carboxymethylcellulose, ethylcellulose, hydroxyethylcellulose, hydroxy-methylethylcellulose, hydroxyethylpropylcellulose, methylhydroxyethyl-cellulose, methylcellulose; amylose, seagel, starch acetates, starch hydroxyethyl ethers, ionic starches, long-chain alkyl starches, dextrins, amine starches, phosphates starches, dialdehyde starches, corn starch, potato starch; pectin, amylopectin, xylan, glycogen, agar, alginic acid, phycocolloids, chitin, gum arabic, guar gum, gum karaya, gum tragacanth, locust bean gum, lignin, nitrolignin, calcium lignosulfonate, sodium lignosulfonate, or molasses.

4. The group of pellets of claim 1 wherein the binder includes a lignosulfonate.

5. The group of pellets of claim 1 wherein water causes each pellet of the group of pellets to disperse into between 300 and 10,000 pieces.

6. The group of pellets of claim 1 wherein the mean pellet domain size ranges from 0.5 mm to 4 mm.

7. The group of pellets of claim 1 wherein the dispersion occurs in a time period of between 30 seconds and 1 hour.

8. A process of forming a group of spent lime pellets comprising:
   dewatering spent lime present from 96 to 99.5 total weight percent to a free-flowing powder; and
   adding a binder component present from 4 to 0.5 total weight percent under conditions to induce agglomeration of the free-flowing powder so as to form the group of pellets of claim 1.

9. The process of claim 8 wherein the free-flowing powder has a moisture content of between 0.1 and 5 total weight percent.

10. The process of claim 8 wherein said dewatering is by settling.

11. The process of claim 8 wherein said dewatering is by pressing.

12. The process of claim 8 further comprising grinding the spent lime to obtain spent lime particles with a mean particle size based on particle number of between 10 and 175 microns.

13. The process of claim 8 further comprising washing the spent lime prior to said dewatering.

14. The process of claim 8 wherein said adding occurs in a pan agglomerator.

15. The process of claim 8 further comprising incorporating a soil nutrient into the pellets.

16. The process of claim 8 further comprising grading the spent lime pellets into size-dependent grades.

17. A process of treating a target crop comprising:
broadcasting pellets of claim 1 onto an area of soil containing the target crop;
exposing the area to an amount of water sufficient to induce pellet dispersion into substituent spent lime particles adapted to percolate into the soil to treat the target crop.
18. The process of claim 17 wherein the target crop is turf.

\* \* \* \* \*